United States Patent [19]

Burgess et al.

[11] Patent Number: 5,254,845
[45] Date of Patent: Oct. 19, 1993

[54] AUTOMATIC FOCUSING SYSTEM USING FOCAL LENGTH-CHANGING ELEMENT

[75] Inventors: David C. Burgess; Clive A. Stubbings, both of Cheshire, Great Britain; Jacques Ginestet; Ilya Ravkin, both of Santa Clara, Calif.

[73] Assignee: Applied Imaging International Limited, Cheshire, Great Britain

[21] Appl. No.: 931,944

[22] Filed: Aug. 18, 1992

[51] Int. Cl.⁵ .............................................. G01J 1/20
[52] U.S. Cl. ................................ 250/201.3; 250/201.7
[58] Field of Search ............... 250/201.3, 201.7, 201.8, 250/204, 216; 359/368, 383; 354/406, 407, 408

[56] References Cited

U.S. PATENT DOCUMENTS 4,415,246 11/1983 Karasaki et al. .................. 250/201.7
4,548,495 10/1985 Suzuki ............................. 250/201.8

Primary Examiner—David C. Nelms
Assistant Examiner—K. Shami
Attorney, Agent, or Firm—Harrison & Egbert

[57] ABSTRACT

In an automatic focusing system an element (2) is inserted in the path of a beam of light (3) directed towards a sensor array. The element comprises a transparent material or predetermined reflective index, the element presenting a first region (4) of a first thickness and another region (5) of a greater thickness. The image falling on to the sensor comprises three areas—one area where the light has passed through the one region and another area where the light has passed through the further region and yet another area. The automatic focusing system derives signals from two of the areas and processes the signals so that the image is in focus in the third area.

10 Claims, 2 Drawing Sheets

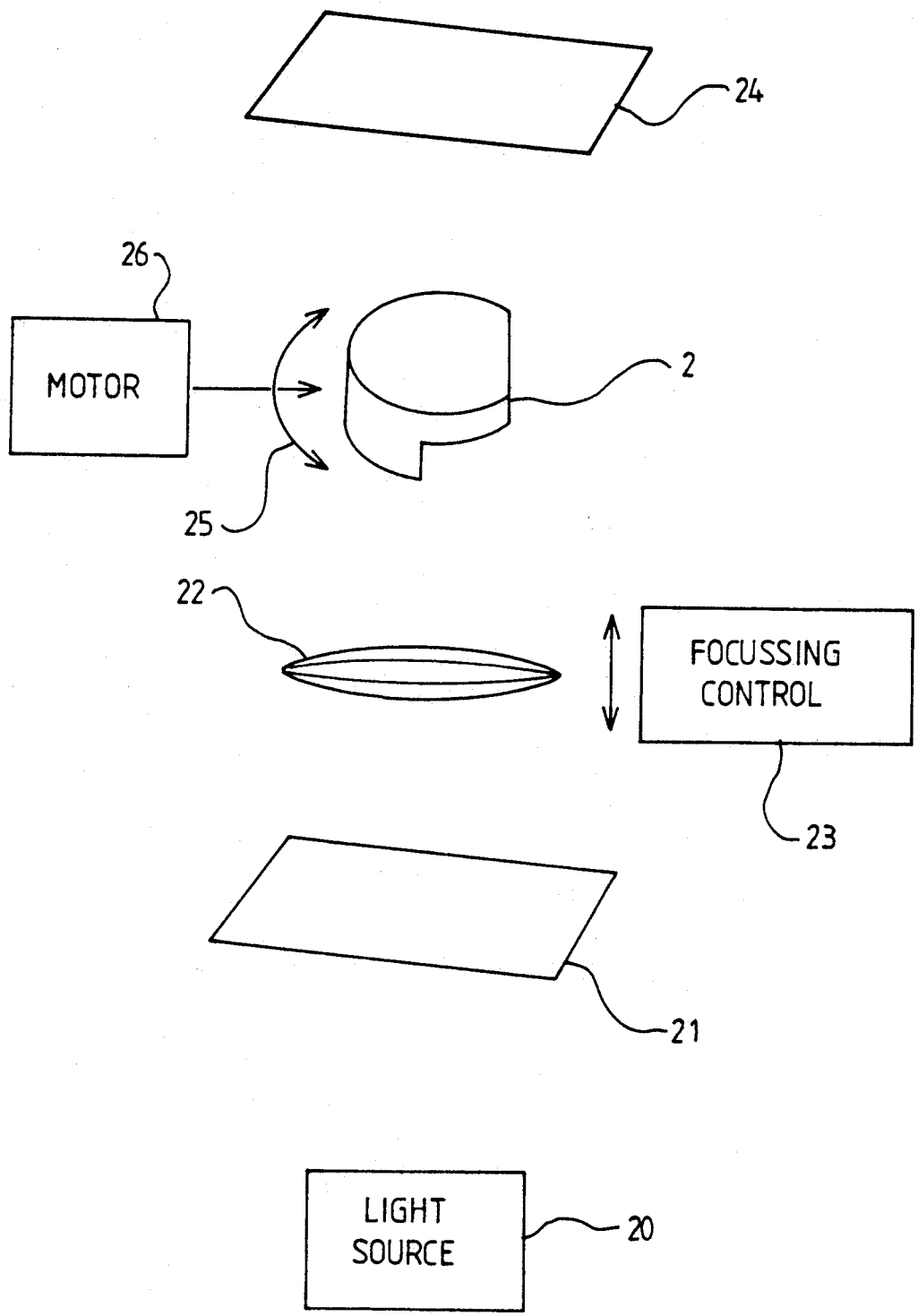

AUTOMATIC FOCUSING SYSTEM USING FOCAL LENGTH-CHANGING ELEMENT

TECHNICAL FIELD

THE PRESENT INVENTION relates to an automatic focusing system.

BACKGROUND ART

It has been proposed previously to provide an automatic focusing system, especially for use in focusing an image analysis system used to analyse the nature of cells present on a slide, which system effectively comprises a microscope.

Initial attempts at providing automatic focusing involved the use of a beam split attachment which split the image into three separate beams. Each respective part of the split beam was directed towards a respective image sensor. One sensor was located in the main focal plane of a relevant beam and the other two sensors were located respectively just short of and just behind the main focal plane of the respective beams. A focus error signal was then derived from the sensors, the signal consisting of a suitable non-linear function of illumination which favoured light/dark transitions at the edges of the objects and within objects. This signal was integrated for each sensor over the same field of view since, at any instant, the same image portion would be directed towards the three sensors. The integral would be a maximum for a sensor on which the image is sharply focused and the value of the integral provided by the two sensors which are equally out of focus would be the same. Consequently, the focusing of the arrangement could be adjusted so that the value of the integral derived from the main sensor would be at a maximum, and the value of the integrals obtained from the remaining two sensors would be equal.

Subsequently a modified automatic focusing arrangement was disclosed in European Patent Application 0163394A2. In this European Specification the focusing device comprises a sensor assembly having at least two arrays of sensor devices, with one array being in front of the optical image plane and the second array being behind the optical image plane. The sensor assembly has lines of pixel sensor elements. A differential contrast measure is taken from the pixel elements of the sensor which provides both the sign and magnitude of any focus error. This allows the focus motor to be driven in the correct direction. The differential contrast is calculated between one pixel and the next adjacent pixel. A contrast measure is taken from a selected number of pixels. The difference between the contracted pixel values will be greater for an image in focus than for a blurred image. The difference between the selected pixels is measured, and the large values are enhanced, for example by raising the measured values to a power. The measured values, when raised to a power may be summed to provide an indication of how well focused the object is. Exaggerating the large values is necessary because when considering an out of focus image, a number of small differences may sum to a value similar to a large single difference obtained from an image in focus. The image is moved relative to the sensor assembly (or the sensor is moved relative to the image) so that the same image area may be sequentially directed towards the two arrays. Signals are derived from the two arrays to generate a focus drive signal. The sensor of European Publication 0163394A2 is provided in addition to two further outputs of a microscope, one comprising a binocular eye-piece tube, and the other being in the form of a camera port, although the camera port is not usually active. Thus a beam splitter is required and three beams are created within the microscope, each with its own focus plane.

The present invention seeks to provide an improved automatic focusing device.

SUMMARY OF THE INVENTION

According to this invention there is provided an automatic focusing system for focusing an image on an area two dimensional sensor array, which sensor array comprises a plurality of sensors adapted to sense the image for subsequent use, the arrangement including an element inserted in the path of a beam or light directed towards the sensor array and comprising a transparent material of a predetermined refractive index, the element presenting at least one region of a predetermined thickness through which a part of the image may pass and a further region of a greater predetermined thickness through which another part of the image may pass, the image falling on the sensor array comprising three areas, one area where the image has passed through said one region, another area where the image has passed through the said further region, and a further area. The element may be a single integral element or may comprise two element parts, one comprising a region of a predetermined thickness and another comprising the further region of greater predetermined thickness. The element may have three or more regions and may thus present a thin region, an intermediate region and a thick region.

Preferably the element is made of glass having a high refractive index, such as at least 1.5. The use of high refractive index glass minimises any "shadows" caused by discontinuities between the various regions of the element. In one embodiment the element has an overall configuration equivalent to a circle with a sector bounded by a straight edge being cut away, the region of greater thickness having the form of a sector of a circle of the same diameter with a straight edge, said straight edges being parallel.

In this embodiment the optical element may be mounted, preferably so that it can be adjusted rotationally, in the projection optics of microscope.

In an alternative embodiment of the invention the element is square or rectangular, and in this embodiment the element may be secured directly to a sensor array.

Preferably means are provided to determine the sharpness of the image in said another area and said further area of the image, and to perform an algorithm to control a focus adjusting mechanism so that the image is in focus in the said one area.

In a system in accordance with the invention, the sensor array is preferably adapted to provide an output representative of the focused image, the array developing said output from the said one area. It is thus to be understood that the sensor array may comprise the main output sensor array of a microscope or camera, for example. Consequently the focusing arrangement can be incorporated in the microscope or camera at minimal additional cost since no beam splitter is required and no separate sensor array is required.

In order that the invention may be more readily understood, and so that further features thereof may be appreciated, the invention will now be described, by way of example, with reference to the accompanying drawing in which

BRIEF DESCRIPTION OF THE DRAWINGS

FIG. 2 is a diagrammatic view illustrating the element in a microscope.

DETAILED DESCRIPTION OF THE INVENTION

Figure 1:
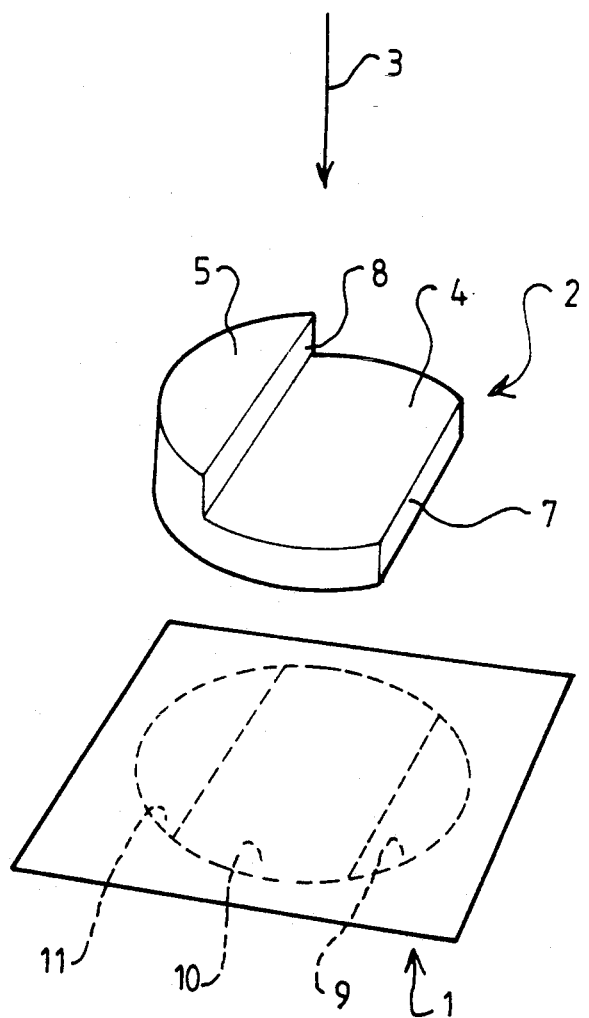
FIG. 1 is a perspective view of a glass element and an imaging array which are intended to be fitted to a microscope.

Referring now to the drawing, it is to be appreciated that in an automatic focusing system in accordance with the invention, a single two dimensional imaging array 1 is intended to be utilised from which is developed image information for subsequent use and also information to facilitate a focusing of an associated optical system. The optical system includes an optical element 2 which serves the purpose of creating, in a single optical image, three areas of different respective focal planes.

It is to be understood that for a planar piece of glass placed into a converging light path, the position of focus is shifted by an amount of $(1=1/N)'1'$ where N is the refractive index of the glass and T is the thickness of the piece of glass. Thus, for glass of a refractive index or 1.5 the shift in the focus is $(\frac{1}{3})T$.

It has thus been realised that if part of an image passes through a piece of glass of a predetermined thickness, the position of focus of that path of the image will be shifted by a predetermined amount. Thus, the described embodiment of the invention provides an optical element 2 which consists of a piece of transparent glass to be located in position extending transversely of a converging beam as schematically illustrated by the arrow 3. The piece of glass, however, comprises a main region 4 of a predetermined thickness and another region 5 of a greater thickness. Preferably the thickness of the region 5 is twice the thickness of the region 4. The element 2 has a planar lower surface. Each region 4 and 5 has a planar upper surface which is parallel to the lower surface.

The optical element 2 is adapted to be designed so that only part of the optical beam 3 passes through the optical element 2. In the embodiment illustrated the optical element has an outer periphery of circular form with a segment cut off. Thus part of the circumference of the element is part circular 6, and part is bounded by a straight side 7. The region 5 which is of twice the thickness of the main region is also in the form of the segment of a circle, the circular part of the periphery of the region 5 being co-aligned with the circular periphery 6, the linear side 8 of the region 5 being substantially parallel with the said linear side 7. The linear side 8 is perpendicular to the upper surfaces of the regions 4 and 5. The region 5 is selected to be of a lesser size than the region 4.

It is to be appreciated that a light beam 3 passing through the optical element 2 will impinge upon the detector 1 in three distinct areas. In the first area 9 the light will not have passed through the optical element and will thus have a nominal focal plane. In the second area 10, the light will have passed through the main region 4 of the optical element and will have an optical plane shifted by $\frac{1}{3}T$ if the refractive index of the glass is 1.5 and the thickness of the region 4 is T. In the area 11 of the image, the beam has passed through the region 5 of the optical element and thus the focal plane will be shifted by $\frac{2}{3}T$. Thus, if the focusing arrangement is so adjusted that the image in the area 10, passing through the single thickness of glass in the region 4 of the optical element 2 is in focus in the plane of the sensor array 2, the image in the area 9 will be focused $\frac{1}{3}T$ on one side of the image plane and the image in the area 11 will be focused $\frac{1}{3}T$ on the other side of the image plane. A focusing algorithm as disclosed in European Publication 0163394A2 may then be used to derive an error focus correction signal. In that algorithm the image and the sensor moved relative to one another so that the same image area was used in the two areas optically behind and in front of the focal plans. In contrast, in the described embodiment of the invention, different areas of the image will be present in the different areas 9, 10 and 11 on the sensor array. It is, however, believed that, notwithstanding the fact that different image areas are present, the focusing algorithm will operate in a satisfactory manner.

The optical element 2 is intended to be located at a spaced position from the image array 1, for example, at the projection optics field stop. It is to be understood that the optical element should be mounted at, or near to, a focal plane in the optical path. The element 2 is preferably mounted so that it can be adjusted rotationally to have the desired position, with the linear side aligned with rows of pixels in the sensor array.

In an alternative embodiment of the invention, the optical element may be of rectangular form, so that it can be adhere directly to the optical array. When the optical element is adhered to the sensor array care must be taken to ensure that the linear sides (equivalent to the sides 7 and 8) are aligned with the rows of pixels present in the sensor array.

It is preferred to utilise glass having as high a refractive index as possible. This results in the regions 4 and 5 being as thin as practicable. This means that the vertical step between the regions is as small as possible, whilst still maintaining the desired focus separation. This minimises any shadows which can otherwise be developed from the side edges 7 and 8 which effectively cause discontinuities. Any shadows can also be minimised by making these edges to be of as high a quality as possible. Edges which are in any way rough or irregular will lead to the creation of shadows.

Referring now to FIG. 2 the operative parts of a microscope are illustrated schematically. A light source 20 is provided, and light from the light source passes through an image to be viewed which may be mounted on a transparent slide 21. Light from the light source passes through an appropriate lens system illustrated schematically at 22, which is associated with a focusing control 23. The focusing control may effect focusing of the light in any convenient way.

The light then passes towards a sensor array 24.

The optical element 2 as described above is mounted at or near the focal plane defined by the lens system 22. The element 2 is mounted so that it can be rotated, as indicated by the arrow 25, by means of a motor 26. The element 2 can thus be adjusted so that the linear side is aligned with rows of pixels in the sensor array 24.

While the invention has been described with reference to a microscope it is to be appreciated that the invention may find many different applications. Many modifications may be effected without departing from the scope of the invention as defined in the following claims.

What is claimed is:

1. An automatic focusing system for focusing an image on an area two dimensional sensor array, which sensor array comprises a plurality of sensors adapted to sense the image for subsequent use, the arrangement including an element inserted in the path of a beam of light directed towards the sensor array and comprising a transparent material of a predetermined refractive index, the element presenting at least one region of a predetermined thickness through which a part of the image may pass and a further region of a greater predetermined thickness through which another part of the image may pass, the image falling on the sensor array comprising three areas, one area where the image has passed through said one region, another area where the image has passed through the said further region, and a further area.

2. A system according to claim 1 wherein the refractive index of the glass is at least 1.5.

3. A system according to claim 1 wherein the element has an overall configuration equivalent to a circle with a sector bounded by a straight edge being cut away, the region of greater thickness having the form of a sector of a circle of the same diameter, with a straight edge, the said straight edges being parallel.

4. A system according to claim 1 embodied in a microscope, the said optical element being mounted in the projection optics of the microscope.

5. A system according to claim 4 wherein the optical element is mounted so that it can be adjusted rotationally.

6. A system according to claim 1 wherein the element is square or rectangular.

7. A system according to claim 6 wherein the element is secured directly to a sensor array.

8. A system according to claim 1 wherein means are provided to determine the sharpness of the image in said another area and said further area of the image, and to perform an algorithm to control a focus adjusting mechanism so that the image is in focus in the said one area.

9. A system according to claim 1 wherein the sensor array is adapted to provide an output representative of the focused image, the array developing the said output from said one area.

10. An automatic focusing system for focusing an image on an area to dimensional sensor array, which sensor array comprises a plurality of sensors adapted to sense the image for subsequent use, the arrangement including an element made of glass having a high refractive index inserted in the path of a beam of light directed towards the sensor array, the element presenting one region of a predetermined thickness through which part of the light forming the image may pass, and a further region of a greater predetermined thickness through which another part of the light forming the image may pass, the element being so-located that the light forming a further part of the image passes adjacent the said one region and said further region of the element, the image falling on the sensor array comprising three areas namely one area where the image has passed through the said one region, another area where the said image has passed through the said further region, and a further area where the image has passed adjacent the said one region and the said further region, means being provided to determine the sharpness of the image in said another area and in said further area of the image, and to perform an algorithm to control a focus adjusting mechanism so that the image is in focus in the said one area.

* * * * *